Sept. 25, 1956 R. WILLE 2,764,638
SIGNALLING SYSTEM FOR TELEPHONE EQUIPMENT
Filed June 16, 1951
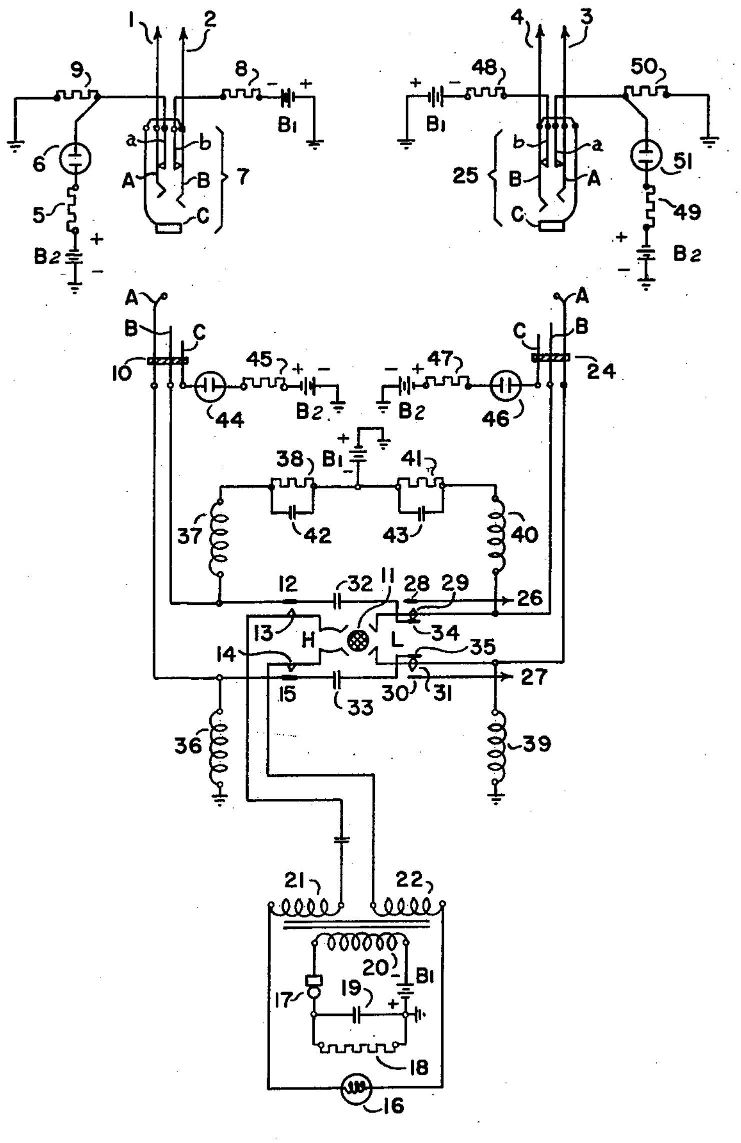
INVENTOR:
RICARDO WILLE
BY John I. Bellamy
ATTORNEY.

United States Patent Office 2,764,638

Patented Sept. 25, 1956

2,764,638

SIGNALLING SYSTEM FOR TELEPHONE EQUIPMENT

Ricardo Wille, Mexico City, Mexico, assignor, by mesne assignments, to International Telephone and Telegraph Corporation, a corporation of Maryland Application June 16, 1951, Serial No. 231,968

2 Claims. (Cl. 179—72)

The present invention relates generally to a novel system for indicating the opening and closing of electric circuits in telephone equipment, for the purpose of indicating the arrival of calls or the termination of conversations.

More specifically, the present invention relates to the novel and useful application, as the means for signaling the opening and closing of electric circuits in telephone equipment of lamps generally known as "cold cathode tubes" such as neon gas tubes and the like, i. e., those lamps which produce light by the discharge, in gases maintained under reduced pressure or rarified, of an electric current of predetermined voltage applied to the electrodes of the tube.

In telephone equipment now in use, the arrival of calls or the end of conversations is signaled by the use of electro-mechanical devices which act upon indicator plates, or relays which by electrical contacts establish circuits that light up incandescent filament lamps.

Now with the system of my invention, i. e. with the use of cold cathode tubes or gas discharge tubes, the employment of the above-mentioned electro-mechanical devices or of the relays can be dispensed with, and by their elimination great technical advantages are achieved due to the elimination of moving mechanisms and the reduction in the space requirement of the installations, as well as great economic advantages due to the reduction in the cost of such installations.

Briefly it may be stated that the present invention essentially resides in the utilization, by means of suitable electrical circuits, in the signaling systems for telephone equipment, of the property or characteristic possessed by the lamps in question, i. e. the so-called cold-cathode or gas-discharge lamps, namely that such lamps require a predetermined minimum voltage to light up, and which makes it possible to provide them with a supply source of electric current below the said voltage so that when the voltage of the supply source rises slightly—upon operation of the telephone call and communication system—the lamps are lit up, thereby obtaining the appropriate signals.

These and other features and advantages of the system of this invention will become more clearly apparent in the course of the description which follows, and from the accompanying drawing showing an illustrative example of this system and wherein like reference characters are employed to designate like parts.

On the drawing:

The single figure is a diagrammatic representation of the electric circuits of a telephone switchboard in which the signaling of the initiation of a call or the termination of a conversation is effected in accordance with the system of the present invention.

Before proceeding with a detailed description of the signal system of the present invention I wish it to be clearly understood that the drawing illustrates exclusively an example of the application of this system to a given telephone installation, but that the invention is not by any means limited to the specific details illustrated and described and that, therefore, any variations, modifications and changes that are deemed convenient or necessary may be made in practice provided they do not depart from the scope of the invention as defined in the appended statement of claims.

With reference to the figure of the accompanying drawing, which by way of example illustrates a telephone switchboard for two lines and one cord circuit, 1 and 2 are the conductors of a telephone line corresponding to a telephone set (not shown in the diagram) of any desired type in which by lifting the receiver, pressing a button or by similar means, said conductors make contact and close a circuit.

Numerals 3 and 4 designate the conductors of the line of the other telephone set, likewise not shown in the drawing, in which contact is established between conductors 3 and 4 and another circuit is thereby closed, in the manner already described with reference to the first line.

$B_1$ symbolically indicates the provision of a battery or another source of energy in its place, whose positive pole is grounded. This battery $B_1$ serves to supply the usual transmitter-feed current for the telephone sets, and when the occasion arises, to supply the additional voltage required for actuating the gas-discharge tubes acting as signaling means when the minimum voltage necessary for lighting up these tubes has been exceeded.

$B_2$ likewise symbolically indicates the provision of another battery or source of energy whose negative pole is grounded while the positive pole is connected to the gas discharge tubes acting as signaling means, which are symbolically indicated by numerals 6, 44, 46, and 51 in the drawing, supplying to these tubes a voltage below that necessary for their operation, whence it will be readily understood that these tubes will not light up unless they receive an additional voltage, which they do when receiving a feed current from battery $B_1$.

Numerals 5 and 9 with respect to conductors 1 and 2, and numerals 49 and 50 with respect to conductors 3 and 4 designate resistors for insuring that the changes of voltage will produce the desired results in the system according to the invention.

Numerals 8 and 48 indicate resistors which protect the battery or source of energy symbolically indicated at $B_1$ against grounding of the wires 2 and 4 which might occur.

Numerals 45, 47, 38, and 41 also designate resistors in the circuits of the switchboard which contribute toward the proper functioning of the system according to this invention.

Numerals 7 and 25 designate jacks for receiving the plugs of the cord circuits, with their respective tip, ring, and sleeve contacts A and *a*, B and *b*, and C.

Numerals 10 and 24 indicate the plugs corresponding to the jacks 7 and 25. Numeral 11 designates the lever of the key cord circuit, and letters H and L indicate the actuated positions which this key can occupy.

Numeral 16 refers to the receiver of the switchboard operator, and 17 is the associated microphone. 18 is a resistor and 19 a condenser. 20, 21, and 22 are the windings of a transformer (induction coil).

Numerals 12, 13, 14, 15, 28, 29, 30, 31, 34, and 35 indicate key contacts to which the lever 11 corresponds.

26 and 27 are conductors which supply the ringing current from a source of energy not shown.

Numerals 23, 32, and 33 designate the usual condensers in the cord circuit, and numerals 42 and 43 also indicate condensers, but these are intended to maintain the voltage constant in the circuits to which they belong.

Numerals 36, 37, 39, and 40 indicate reactance coils, which are conventional in telephone equipment.

*Operation of the signal system according to the invention as applied to the illustrated telephone equipment*

When the receiver is lifted at the telephone apparatus connected to the switchboard by conductors 1 and 2 or when these conductors are interconnected by other means, the following electric circuit is established: Plus pole of battery $B_2$, resistor 5, gas-discharge tube 6, contacts *a* and A of jack 7, conductor 1 of the line, telephone connected thereto, which by lifting the receiver or by other means established connection between conductors 1 and 2, conductor 2 of the line, contacts B and *b* of jack 7, resistor 8, minus pole of battery (or energy source) $B_1$; and as the plus pole of the latter and the minus pole of $B_2$ are grounded, the combined voltages of the two batteries or sources of energy act upon lamp 6 so that the latter will light up, thereby indicating that a connection is wanted over line 1, 2.

Resistor 9, connected at one end to ground (the plus pole of the battery or energy source $B_1$) and at the other end to the contact *a* of jack 7, serves the purpose of preventing, so far as possible, improper lighting-up of the lamp 6 in the event of defects in the insulation between line wires 1 and 2, causing a voltage drop in the insulation resistance existing between the two wires, and thereby preventing the voltage applied to lamp 6 from attaining a value that is equal to or greater than the starting or operative voltage for this lamp.

However, resistor 9 is of sufficiently high resistance value that the voltage drop caused in resistance 8, wires 1 and 2 and in the telephone connected thereto will not prevent the lamp 6 from lighting up.

When the lamp 6 lights up, the operator inserts the plug 10 into the jack 7, whereby she breaks the contacts at A, *a* and B, *b* respectively, whereupon the lamp 6 ceases to be lit, since the voltage then applied to it is only that of the battery or source of energy $B_2$ which, as already mentioned, is insufficient to keep the lamp burning.

After introducing the plug 10 into the jack 7, the operator moves the lever 11 of the key into speaking position "H," thereby closing contacts 12, 13 and 14, 15 respectively so that the operator can converse with the calling party by using the receiver 16 and microphone 17, in the usual manner.

In order to connect the calling party, for example, with the telephone connected to the switchboard by conductors 3 and 4, the operator inserts the plug 24 into the jack 25 and sends a ringing current line from supply wires 26, 27, by moving the lever 11 of the key of the cord to the position marked "L."

When the party being called answers, and so long as the operator leaves the key lever 11 in the normal position, the connection between the two parties is maintained, the jack 7 being connected through plug 10, condensers 32, 33, key contacts 34, 29 and 35, 31 respectively to the jack 25.

The feed current for the telephone connected to jack 7 comes from the battery or energy source $B_1$ through the following circuit: grounded plus pole of the battery or energy source $B_1$, reactance coil 36, contact A of plug 10, contact A of jack 7, line wire 1, through the telephone connected thereto, line wire 2, contact B of jack 7, contact B of plug 10, reactance coil 37, resistance 38 to the minus pole of battery or energy source $B_1$.

The feed current for the called telephone, connected to jack 25 also comes from the battery or energy source B, through a similar circuit including parts 39 and 40.

The calling supervisory lamp 44 is connected, while plug 10 is in jack 7, on the one hand to the plus pole of battery $B_2$, through resistor 45, and on the other hand to the minus pole of battery $B_1$, through contact C of plug 10, contact C of jack 7, contact B of jack 7, contact B of plug 10, reactance coil 37 and resistor 38. So long as the receiver remains off the telephone connected to line wires 1, 2, or so long as feed current flows through over these wires through resistor 38 and reactance coil 37, a voltage drop will exist across the latter, which, by keeping the voltage applied to lamp 44 below the lighting-up or operative value, prevents the lamp from being lit during the conversation. Called supervisory lamp 46, being in an obviously similar circuit, likewise remains unlit during conversation.

When the conversation is finished and the receiver of the telephone connected to line wires 1 and 2 is placed back, or the circuit between these wires broken in some other manner, the feed current ceases to flow through resistor 38 and reactance coil 37, so that there is no more voltage drop across these elements; this will cause the total of the voltages of batteries or energy sources $B_1$ and $B_2$ to act on the circuit of calling supervisory lamp 44 which accordingly lights up to signal the termination of the conversation by the calling party. In the same manner, called supervisory lamp 46, connected to battery $B_2$ through resistor 47, will light up when the receiver at the called telephone connected to wires 3, 4 is replaced and feed current ceases to flow through resistor 41 and reactance coil 40.

When the operator receives the signal, comprising the lighting up of lamps 44 and 46, that both parties have finished their conversation, she interrupts the connection by withdrawing plugs 10 and 24 from jacks 7 and 25 respectively, whereupon lamps 44 and 46 become extinguished.

Resistors 8 and 48 protect the battery or energy source $B_1$ against possible grounding of wires 2 and 4.

Resistors 49, 50, and lamp 51 perform the same function for the line comprising wires 3 and 4 as the resistances 5, 9 and lamp 6 perform for the line comprising wires 1 and 2.

*Discussion*

By way of example, one commercially available type of gas-discharge lamp which is considered satisfactory for use at 6, 51, 44, and 46 in the illustrated system has substantially the following characteristics:

1. Normal lighting current, 3 milliamperes (ma.);
2. Starting voltage, 90 volts; and
3. Maintaining voltage, 75 volts.

When this type of lamp is used, any resistor such as 5 is so selected that the flow of lighting current through the associated lamp is restricted to about 3 ma.

*Using conventional cord circuits*

If conventional cord circuits are used, rather than cord circuits of the relayless type shown, then for the noted type of lamp, resistors 8 and 9 may have values of, for example, 100 ohms and 4000 ohms, respectively, when $B_1$ is a 25-volt battery and the series resistance of the looped line wires such as 1 and 2 (when connected together through a telephone), is no more than 900 ohms. The line current before breakdown of lamp 6 is then 5 ma. for the total resistance of circuit through elements $B_1$, 8, 2, 1, and 9 is 5000 ohms. The drop across resistor 9 is then four fifths of the voltage of battery $B_1$, or 20 volts.

If battery $B_2$ is a 72-volt battery, the operation of lamp 6 under the foregoing assumptions is as follows:

When a call is initiated over line 1, 2, the assumed 20-volt drop across resistor 9, added to the 72-volt potential of battery $B_2$, provides a starting voltage for lamp 6 of 92 volts, which is two volts above the minimum. Lamp 6 thereupon lights, drawing its assumed lighting current (3 ma.), which amounts largely to an increase in the line current.

Since battery $B_2$, at 72 volts, is below the noted maintaining voltage (75 volts), lamp 6 is extinguished by the opening of the contacts of jack 7, when the call is answered, or by the replacement of the receiver at the calling telephone if that occurs before the call is answered.

It is clear that lamp 6 will light, when intended, even if the shunt circuit path through resistor 9 is removed, but the lamp 6 is then too sensitive to small leaks between wires 1 and 2.

It is clear from the foregoing discussion that line lamps such as 6 and 51 may be controlled as set forth over common-battery talking, or signaling, lines of normal maximum commercial length (such as 850 ohms wire resistance). On the other hand, for common-battery talking under the foregoing assumptions, the disclosed use of supervisory lamps such as 44 and 46 of the illustrated cord circuit is then limited to very short or low-resistance line such as those used within a building served by a private exchange, for the line current is otherwise lower than the minimum of 22 ma. herein assumed to be required for satisfactory transmitter energization.

*Using full illustrated system for normal lines*

If the full system of line-lamp and supervisory-lamp control is used as illustrated with lines of normal maximum length (such as 800 ohms looped resistance), and if the gas-filled lamps used have the foregoing characteristics, the requirement that the flow of line current be at least 22 ma. to insure proper transmitter energization may be met if the assumed battery voltages are altered to the following values:

Battery $B_1$, 50 volts.

Battery $B_2$, 52 volts.

Considering line lamp 6, the previously discussed 20-volt drop across resistor 9 is doubled by doubling the voltage of $B_1$, becoming 40 volts. This voltage drop, plus the 52 volts of battery $B_2$ (a total of 92 volts), causes lamp 6 to light when the associated line is bridged. The lamp 6 obviously becomes extinguished when the line is unbridged, or when a plug is placed in jack 7, for battery $B_2$ is now far below the maintaining voltage (75) of the lamp.

Considering supervisory lamp 44, with plug 10 in jack 7, and with line wires 1, 2 unbridged, the sum of the two battery voltages (102 volts) is effective as a starting voltage, wherefore lamp 44 is then lighted as a supervisory signal.

When the wires 1, 2 become bridged, and if resistor 38 is so chosen that a voltage drop of 30 volts occurs between battery $B_1$ and the upper (ring) strand of the cord circuit, lamp 44 is then extinguished, for its effective voltage is thereby reduced to 72 volts which is below the maintaining voltage of the lamp.

The noted 30-volt drop on the ring strand of the cord is obtained under the present assumed conditions if the concerned resistance values are as follows:

| | Ohms |
|---|---|
| Looped line | 800 |
| Coil **36** | 100 |
| Coil **37** | 100 |
| Resistor **38** | 1250 |
| Total | 2250 |

The resulting value of line curent is 22.2 ma., which is slightly higher than the noted minimum of 22 ma.

One practical desirable feature of the foregoing circuits for controlling the line and supervisory lamps is that the battery $B_2$ may economically comprise a primary battery (dry cells for example), for the only current flow therethrough is the lamp current (about 3 ma. per lighted lamp), whereas the switchboard battery (often a storage battery) supplies the considerably heavier line-current load.

I claim:

1. In combination, a switchboard, signal lines terminating thereat, each line being adapted to be closed and to be opened to impart signals to the switchboard, a first and a second current source each having a free pole and having a grounded pole of a polarity opposite to that of the grounded pole of the other current source, a separate voltage-drop device for each line, signal circuits for said lines respectively, each such circuit extending to its line from the free pole of the first current source and returning to ground through its said voltage-drop device, signal lamps for said lines respectively, means connecting each lamp serially between the free pole of the second current source and the junction of the associated line with its said voltage-drop device, each said lamp being of the type requiring that a voltage greater than that of the second current source be impressed across it to render it conducting to thereby cause it to light, and requiring a lesser maintaining voltage which is also greater than that of the second current source, the values of the foregoing circuit components being so chosen that the sum voltage between the free pole of the second current source and any said junction of a line and its voltage-drop device is at least equal to the said starting voltage when the associated line is closed.

2. In combination, a switchboard, signal lines terminating thereat, each line being adapted to be closed and to be opened to impart signals to the switchboard, a first and a second current source connected in series-aiding relationship to provide a common pole and respective free poles, voltage-drop devices, means for establishing signal circuits for said lines respectively, each such circuit extending to its line from the free pole of the first current source through a separate one of said voltage-drop devices and returning to the said common pole, signal lamps and means connecting each of them between the free pole of the second current source and a separate line at the junction of the latter with its said voltage-drop device, each said lamp being of the type requiring that a voltage greater than that of the second current source be impressed across it to render it conducting to thereby cause it to light, and requiring a lesser maintaining voltage which is also greater than that of the second current source, the values of the foregoing circuit components being so chosen that the sum voltage between the free pole of the second current source and any said junction of line and voltage-drop device is at least equal to the said starting voltage when the associated line is open and is less than the said maintaining voltage when such line is closed.

References Cited in the file of this patent

UNITED STATES PATENTS

| | | |
|---|---|---|
| 1,520,098 | Toomey | Dec. 23, 1924 |
| 1,672,957 | Shackleton | June 12, 1928 |
| 1,845,017 | Edwards | Feb. 16, 1932 |
| 1,860,007 | Bascom | May 24, 1932 |
| 2,119,211 | Holden | May 31, 1938 |